(12) United States Patent
Ishimura

(10) Patent No.: US 6,914,706 B2
(45) Date of Patent: Jul. 5, 2005

(54) OPTICAL MODULATOR

(75) Inventor: Eitaro Ishimura, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 477 days.

(21) Appl. No.: 10/112,859

(22) Filed: Apr. 2, 2002

(65) Prior Publication Data

US 2002/0195622 A1 Dec. 26, 2002

(30) Foreign Application Priority Data

Jun. 21, 2001 (JP) ........................................ 2001-188481

(51) Int. Cl.[7] ................................................ G02F 1/03
(52) U.S. Cl. ..................... 359/245; 359/254; 359/259; 257/21
(58) Field of Search ................................ 359/245–252, 359/254, 259; 257/431, 432, 436, 439, 14, 21, 22, 184

(56) References Cited

U.S. PATENT DOCUMENTS 6,359,720 B1 * 3/2002 Yamada ...................... 359/245
6,549,321 B2 * 4/2003 Noda .......................... 359/248

* cited by examiner

*Primary Examiner*—Hung Xuan Dang
*Assistant Examiner*—Joseph Martinez
(74) *Attorney, Agent, or Firm*—Leydig, Voit & Mayer, Ltd.

(57) ABSTRACT

An optical modulator whose cutoff frequency is not halved even in differential driving, as well as a mounting substrate of such an optical modulator and a driving method of such an optical modulator. An optical modulator manner that two electroabsorption EA modulators A and B are connected in series to each other via a transparent waveguide. When voltages are applied to the two EA modulators simultaneously, light that is input from an end face of the optical modulator is absorbed first by the EA modulator and then by the second EA modulator. Therefore, an extinction ratio that is two times larger than in a conventional optical modulator can be obtained. To prevent pulse superimposition in a modulated light waveform, one line may be made longer than another line so that a drive electrical signal reaches the second EA modulator with a delay. To mount the optical modulator, flip-chip mounting with a coupled coplanar substrate and gold balls or the like may be used.

13 Claims, 8 Drawing Sheets

OPTICAL MODULATOR

BACKGROUND OF THE INVENTION

1. Field of the Invention

The present invention relates to an optical modulator, a mounting substrate of an optical modulator, and a driving method of an optical modulator. In particular, the invention relates to an optical modulator that is driven differentially, a mounting substrate of such an optical modulator, and a driving method of such an optical modulator.

2. Description of Related Art

FIG. 9 shows a structure of a conventional electroabsorption (EA) modulator. The EA modulator utilizes the electroabsorption effect that an optical waveguide having a pn junction absorbs light when an electric field is applied to it. Having a high response speed, the EA modulator is used as an optical modulator for optical communication.

In FIG. 9, reference numeral 1 denotes an InP substrate; 6, a transparent waveguide that is formed on the InP substrate 1; 25, an EA modulator that is connected to the transparent waveguide 6; 30, a p-type electrode pad of the EA modulator 25; 31, an n-type electrode pad of the EA modulator 25; and 5, an n-type ohmic contact layer that is a matching resistor of the EA modulator 25.

To apply a modulation signal voltage to the EA modulator 25, a driver amplifier outputs two kinds of signals, that is, a positive-phase signal and an opposite-phase signal that is opposite in phase to the positive-phase signal. There are two methods for driving the EA modulator 25. The method in which only one of the positive-phase signal and the opposite-phase signal is used is called single-phase driving. The method in which both of the positive-phase signal and the opposite-phase signal are used is called differential driving.

FIG. 10 shows an equivalent circuit in a case where the EA modulator 25 of FIG. 9 is driven by the single-phase driving. The elements in FIG. 10 that are the same as elements in FIG. 9 are given the same reference numerals as the latter and hence may not be described. In FIG. 10, reference numeral 20 denotes a matching resistor that is connected in parallel to the EA modulator 25; 26, an EA modulator driver for driving the EA modulator 25; 27, a positive-phase signal terminal of the EA modulator driver 26 that outputs a positive-phase signal; 28, a ground terminal of the EA modulator driver 26; and 29, an opposite-phase signal terminal of the EA modulator driver 26 that outputs an opposite-phase signal.

FIG. 10 shows an example in which a positive-phase signal is applied to the EA modulator 25 from the positive-phase signal terminal 27. However, a positive-phase or opposite-phase signal can be applied to one end (L-end or M-end) of the EA modulator 25. The matching resistor 20 (e.g., R=50 Ω) is connected in parallel with the EA modulator 25. Terminal B is grounded.

FIG. 11 shows an equivalent circuit in a case where the EA modulator 25 of FIG. 9 is driven by differential driving. The elements in FIG. 10 that are the same as elements in FIG. 9 are given the same reference numerals as the latter and hence may not be described. As shown in FIG. 11, a positive-phase signal and an apposite-phase signal are applied to the two ends (L-end and M-end) of the EA modulator 25. Two resistors 20 (e.g., 2R=50 Ω+50 Ω) are connected in parallel with the EA modulator 25. The connecting point (terminal N) of the two resistors 20 is grounded.

In the differential driving shown in FIG. 11, the voltage that can be applied to the EA modulator is two times higher than in the single-phase driving shown in FIG. 10. In general, a larger extinction ratio can be obtained when the voltage that can be applied to the EA modulator 25 is higher. Therefore, the differential driving can provide a larger extinction ratio. The extinction ratio is a ratio of a maximum value to a minimum value of transmission light intensity that are obtained when the transmission light intensity of an optical modulator is varied, and serves as a barometer of the performance of the optical modulator.

The cutoff frequency fc (single phase) of the EA modulator 25 in the case of single-phase driving is given by Equation (1). The cutoff frequency is a frequency above which light cannot travel through a waveguide.

$$fc(\text{single phase})=1/(2\pi CR) \quad (1)$$

where C is the capacitance of the EA modulator 25 and R is the matching resistance.

On the other hand, in the case of differential driving, the matching resistance is 2 R (50 Ω+50 Ω), which is two times greater than in the case of single-phase driving. Therefore, the cutoff frequency fc (differential) of the EA modulator 25 in the case of differential driving is given by Equation (2).

$$fc(\text{differential})=0.5/(2\pi CR)=0.5\, fc(\text{single phase}) \quad (2)$$

That is, there is a problem that the cutoff frequency fc (differential) in the case of differential driving is as low as a half of the cutoff frequency fc (single phase) in the case of single-phase driving.

SUMMARY OF THE INVENTION

The present invention has been achieved to solve the above problem in the art, and an object of the invention is therefore to provide an optical modulator whose cutoff frequency is not halved even in the case of differential driving, as well as a mounting substrate of such an optical modulator and a driving method of such an optical modulator.

According to a first aspect of the present invention, there is provided an optical modulator, comprising: first and second electroabsorption modulators that are formed on an insulative semiconductor layer and connected to each other in series; and a common electrode to which a first conductivity type electrode of the first electroabsorption modulator and a second conductivity type electrode of the second electroabsorption modulator are connected.

According to a second aspect of the present invention, there is provided a coupled coplanar substrate mounting an optical modulator according to the present invention, such as any one of claims 1 to 4, comprising: a first signal line to which a second conductivity type electrode of a first electroabsorption modulator is flip-chip-bonded; a second signal line to which a first conductivity type electrode of a second electroabsorption modulator is flip-chip-bonded; and a ground line to which the common electrode is flip-chip-bonded.

According to a second aspect of the present invention, there is provided a driving method for driving an optical modulator according to the present invention, such as any one of claims 1 to 4, wherein a positive-phase signal is applied to one of a first electroabsorption modulator and a second electroabsorption modulator and an opposite-phase signal is applied to the other.

The above and other objects, effects, features and advantages of the present invention will become more apparent from the following description of the embodiments thereof taken in conjunction with the accompanying drawings.

DETAILED DESCRIPTION OF THE PREFERRED EMBODIMENTS

Figure 1:
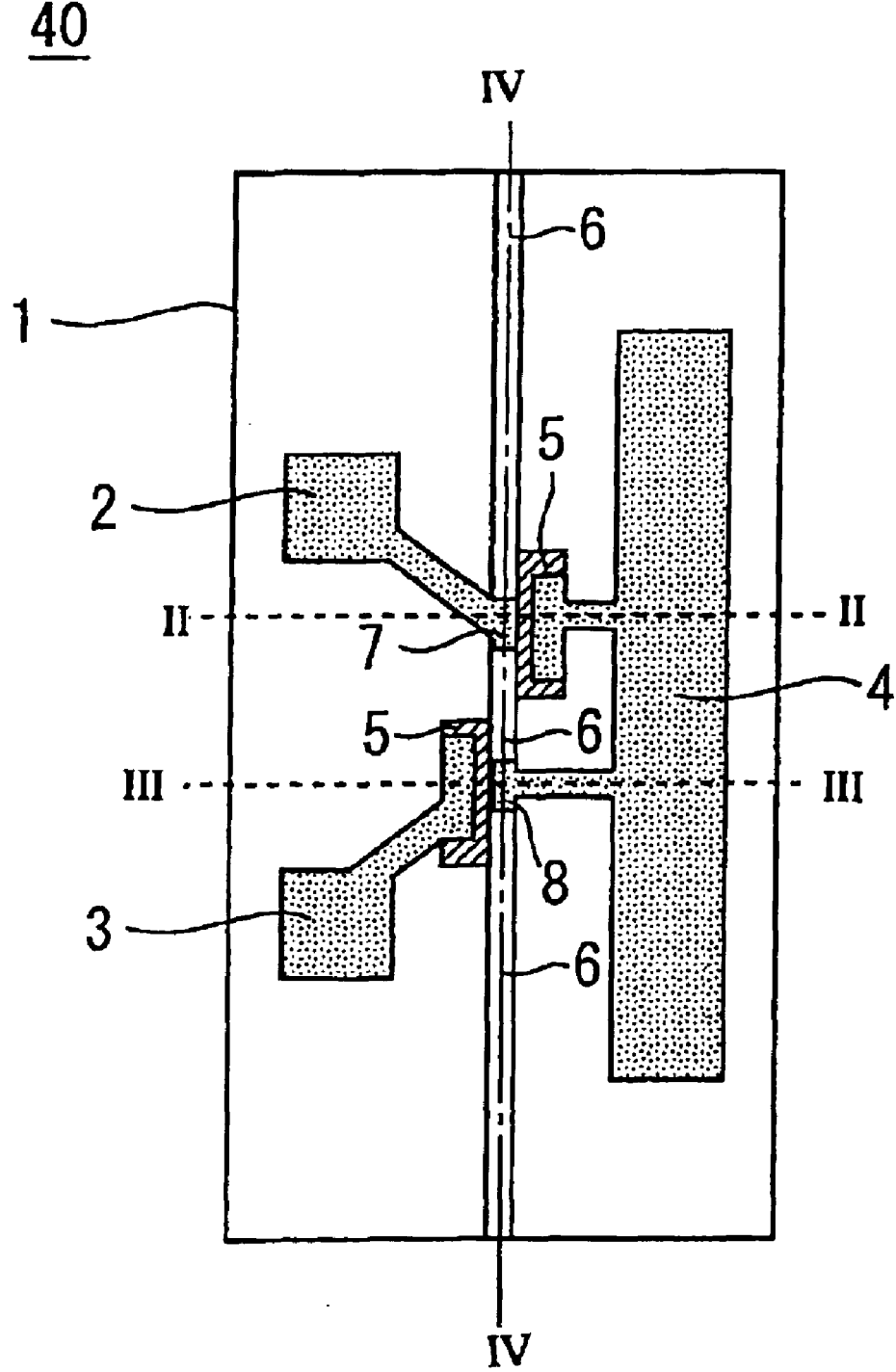
FIG. 1 is a top view of an optical modulator according to a first embodiment of the invention.

Embodiments of the present invention will be described below with reference to the accompanying drawings. It is noted that the same reference symbols in the drawings denote the same or corresponding components.

First Embodiment

FIG. 1 is a top view of an optical modulator according to a first embodiment of the invention. In FIG. 1, reference numeral 40 denotes an optical modulator according to the embodiment; 1, an InP substrate; 6, a transparent waveguide that is formed on the InP substrate 1; 7, an EA modulator A that is connected to the transparent waveguide 6; 8, an EA modulator B that is connected to the transparent waveguide 6; 2, a p-type (second conductivity type) electrode pad of the EA modulator A (7); 3, an n-type (first conductivity type) electrode pad of the EA modulator B (8); 4, a common electrode pad (electrode) of an n-type (first conductivity type) electrode pad of the EA modulator A (7) and a p-type (second conductivity type) electrode pad of the EA modulator B (8); and 5, n-type ohmic contact layers that is matching resistors of the respective EA modulator A (7) and B (8).

As shown in FIG. 1, the optical modulator 40 according to the embodiment is configured in such a manner that the two EA modulators A (7) and B (8) are connected to each other via the transparent waveguide 6. When voltages are applied to the two EA modulators A (7) and B (8) simultaneously, light that is input from an end face C of the optical modulator 40 is absorbed first by the EA modulator A (7) and then by the EA modulator B (8). Therefore, an extinction ratio that is two times larger than in the conventional optical modulator can be obtained. The n-type electrode pad of the EA modulator A (7) and the p-type electrode pad of the EA modulator B (8) are connected to each other via the common electrode pad (electrode) 4. Since the two EA modulators A (7) and B (8) are formed on the single insulative substrate 1, the p-type (second conductivity type) electrode pad 2 of the EA modulator A (7) and the n-type (first conductivity type) electrode pad 3 of the EA modulator B (8) are electrically isolated from each other.

Figure 2:
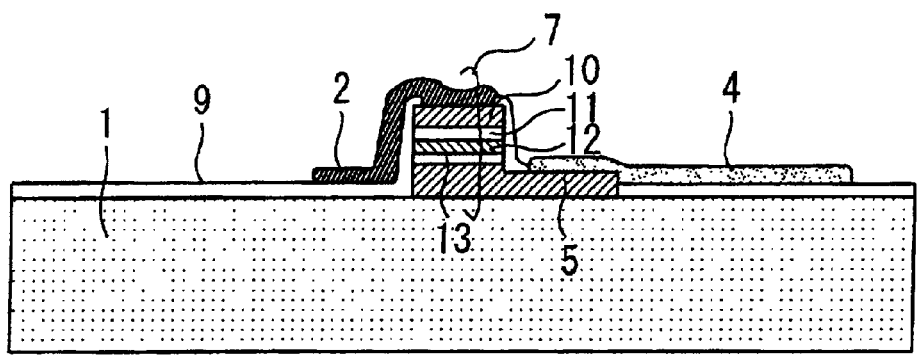
FIG. 2 is a sectional view taken along a line II—II in FIG. 1.
Figure 3:
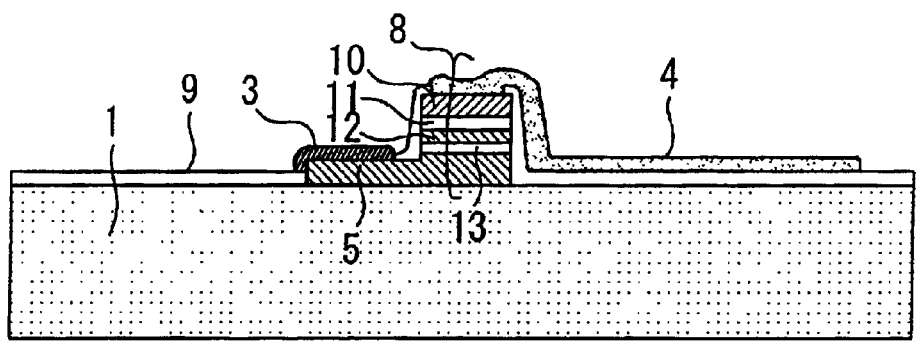
FIG. 3 is a sectional view taken along a line III—III in FIG. 1.
Figure 4:
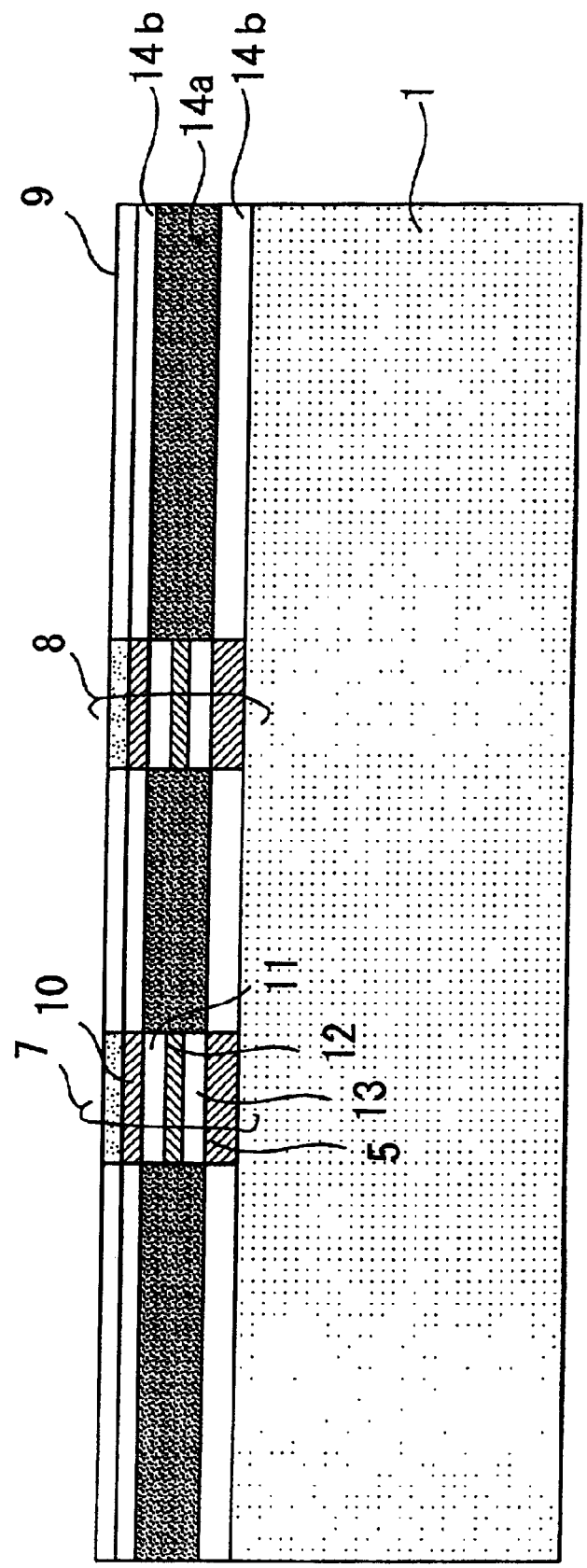
FIG. 4 is a sectional view taken along line IV—IV in FIG. 1.

FIGS. 2–4 are sectional views of the optical modulator 40. FIG. 2 is a sectional view taken along a line II—II in FIG. 1. The elements in FIG. 2 that are the same as in FIG. 1 are given the same reference numerals and not described. In FIG. 2, reference numeral 9 denotes an insulating film that is formed on the substrate 1; 5, the n-type ohmic contact layer on the substrate 1; 13, an n-type cladding layer on the n-type ohmic contact layer 5; 12, a multiple quantum well absorption layer on the n-type cladding layer 13; 11, a p-type cladding layer on the multiple quantum well absorption layer 12; 10, a p-type ohmic contact layer on the p-type cladding layer 11; 7, the EA modulator A; 2, the p-type electrode pad of the EA modulator A (7); and 4, the common electrode pad (electrode).

FIG. 3 is a sectional view taken along a line III—III in FIG. 1. The elements in FIG. 3 that are the same as in FIG. 1 or 2 are given the same reference numerals and not described. In FIG. 3, reference numeral 8 denotes the EA modulator B (8) and numeral 3 denotes the n-type electrode pad of the EA modulator B (8).

FIG. 4 is a sectional view taken along line IV—IV in FIG. 1. The elements in FIG. 4 that are the same as in FIGS. 1, 2, or 3 are given the same reference numerals and not described. In FIG. 4, reference symbol 7 denotes the EA modulator A; 8, the EA modulator B; 14a, a core layer of the transparent waveguide 6; and 14b, cladding layers of the transparent waveguide 6.

Figure 5:
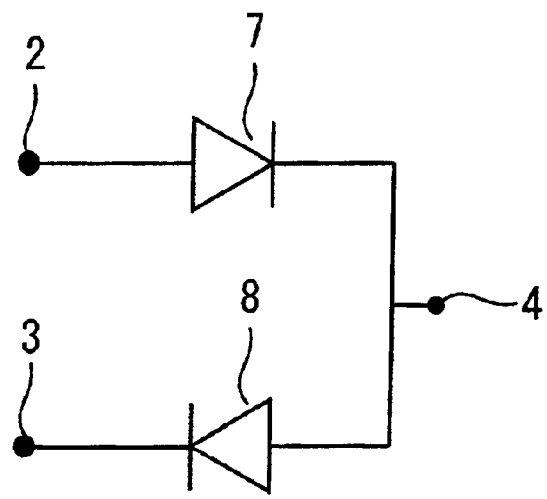
FIG. 5 shows an equivalent circuit of the optical modulator in the first embodiment of the present invention shown in FIG. 1.
Figure 6:
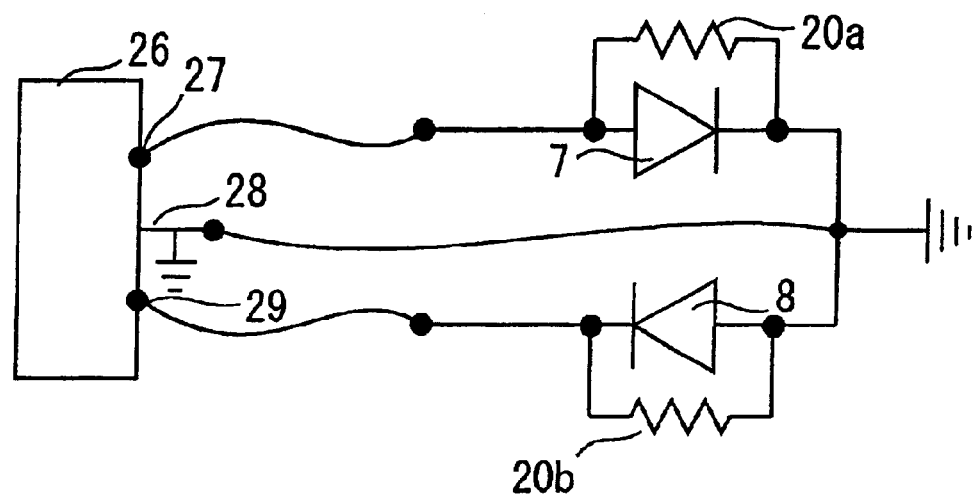
FIG. 6 shows an equivalent circuit of the optical modulator and a driver that are connected to each other in the first embodiment of the present invention.

FIG. 5 shows an equivalent circuit of the optical modulator 40 in the first embodiment of the present invention shown in FIG. 1. FIG. 6 shows an equivalent circuit of the optical modulator 40 and a driver that are connected to each other in the first embodiment of the present invention. The elements in FIGS. 5 and 6 that are the same as in FIG. 1 are given the same reference numerals and not described. In FIG. 6, reference symbol 20a denotes a matching resistor that is connected in parallel with the EA modulator A (7); 20b, a matching resistor that is connected in parallel with the EA modulator B (8); 26, an EA modulator driver for driving the EA modulators A (7) and B (8); 27, a positive-phase signal terminal of the EA modulator driver 26 that outputs a positive-phase signal; 28, a ground terminal of the EA modulator driver 26; and 29, an opposite-phase signal terminal of the EA modulator driver 26 that outputs an opposite-phase signal.

As shown in FIG. 6, the matching resistors 20a and 20b (R=50 Ω) are connected in parallel to the respective EA modulators A (7) and B (8). A positive-phase signal is applied to the EA modulator A (7) and an opposite-phase signal is applied to the EA modulator B (8). Assuming that the EA modulators A (7) and B (8) have the same capacitance (C), the cutoff frequency fc (optical modulator 40) of the optical modulator 40 is given by Equation (3).

$$fc(\text{optical modulator } 40) = 0.644/(2\pi CR) \qquad (3)$$

Comparison between Equations (2) and (3) shows that the cutoff frequency (optical modulator 40) is higher than the cutoff frequency (differential) of the case of the conventional differential driving.

Both of the extinction ratio Ex and the capacitance C of an EA modulator are proportional to its length L. As described above, the optical modulator 40 according to this embodiment can provide an extinction ratio that is two times larger than in the case of the conventional single-phase driving. Therefore, even if the length L of each of the EA modulators A (7) and B (8) is halved, the same extinction ratio as in the conventional single-phase driving can be obtained. Where the length L of each of the EA modulators A (7) and B (8) is halved, the capacitance C of each of the EA modulators A (7) and B (8) is also halved. Equation (4) is obtained by replacing C in Equation (3) with C/2.

$$fc(\text{optical modulator } 40)=1.288/(2\pi CR) \quad (4)$$

Equation (4) means that a cutoff frequency fc (optical modulator 40) that is about 28.8% higher than in the case of the conventional single-phase driving can be obtained under the condition that the extinction ratio is the same.

In summary, in the first embodiment, the optical modulator 40 is configured in such a manner that the two EA modulators A (7) and B (8) are connected to each other in series via the transparent waveguide 6. When voltages are applied to the two EA modulators A (7) and B (8) simultaneously, light that is input from the end face C of the optical modulator 40 is absorbed first by the EA modulator A (7) and then by the EA modulator B (8). Therefore, an extinction ratio that is two times larger than in the conventional optical modulator can be obtained. This makes it possible to provide an optical modulator whose cutoff frequency is not halved even in the case of differential driving, as well as a mounting substrate of such an optical modulator and a driving method of such an optical modulator.

Second Embodiment

Figure 7:
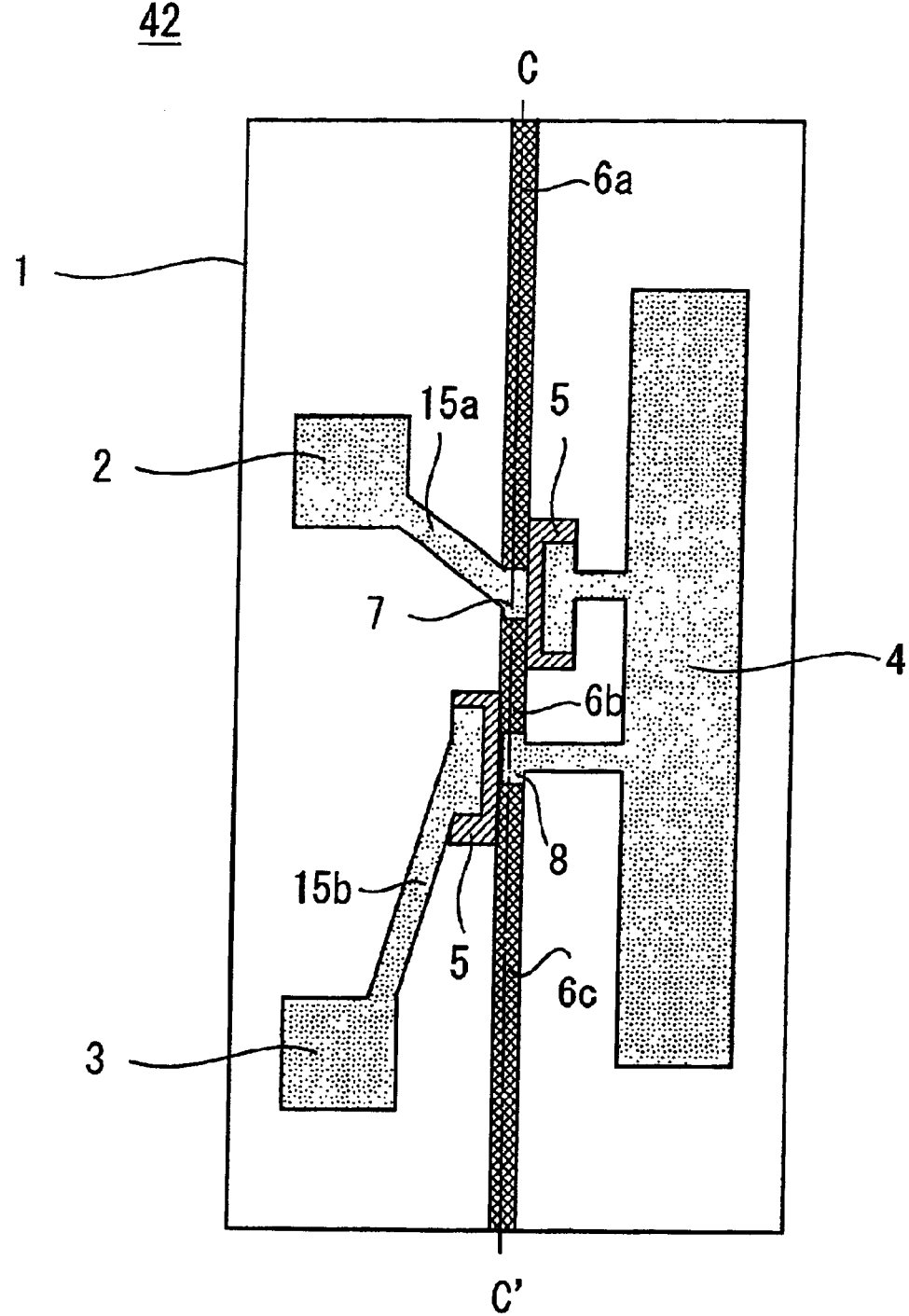
FIG. 7 is a top view of an optical modulator according to a second embodiment of the invention.

FIG. 7 is a top view of an optical modulator according to a second embodiment of the invention. The elements in FIG. 7 having the same elements in FIG. 1 are given the same reference numerals as the latter and hence may not be described. In FIG. 7, reference symbol 42 denotes an optical modulator according to the second embodiment; 6a, a waveguide that connects an end C of the optical modulator 42 to the EA modulator A (7); 6b, a waveguide that connects the EA modulator A (7) to the EA modulator B (8); 6c, a waveguide that connects the EA modulator B (8) to an end C' of the optical modulator 42; 15a, a line that is provided between the EA modulator A (7) and the p-type electrode pad (bonding pad) 2 of the EA modulator A (7); and 15b, a line that is provided between the EA modulator B (8) and the n-type electrode pad (bonding pad) 3 of the EA modulator B (8).

As shown in FIG. 7, light that is input from the end C is modulated by the EA modulator A (7) and the input to the EA modulator B (8) via the connecting transparent waveguide 6b. The length of the connecting waveguide 6b is now represented by Lw. The time Tab that is taken by light that has just exited the EA modulator A (7) to enter the EA modulator B (8) is given by Equation (5).

$$\text{Tab}=Lw/(c/n)=(L w \cdot n)/c \quad (5)$$

where n is the refractive index of the connecting waveguide 6b and c is the speed of light. For example, if the length Lw of the connecting waveguide 6b is equal to 100 μm, the refractive index n is equal to 3.16, and the speed c of light is equal to $3 \times 10^8$ m/s, the time Tab is calculated as about $10^{-12}$ s=1 ps. That is, a delay of about 1 ps occurs between the EA modulators A (7) and B (8). As a result, where modulation is performed at such a high rate as 40 Gbps (25 ps/pulse), for example, adjacent pulses would be superimposed on each other in a modulated light waveform.

To prevent occurrence of such a delay, as shown in FIG. 7, the line 15b that is provided between the EA modulator B (8) and the n-type electrode pad (bonding pad) 3 of the EA modulator B (8) is made longer than the line 15a that is provided between the EA modulator A (7) and the p-type electrode pad (bonding pad) 2 of the EA modulator A (7) so that the application of a drive electrical signal to the EA modulator B (8) is delayed. Another structure for preventing pulse superimposition in a modulated light waveform is possible in which the lengths of the signal lines for driving the respective EA modulators A (7) and B (8) are changed from each other. A further structure is possible in which the modulation by the EA modulator B (8) is performed with a delay of about 1 ps by producing a delay electrically in the driver.

As described above, in the second embodiment, to prevent pulse superimposition in a modulated light waveform, the line 15b that is provided between the EA modulator B (8) and the n-type electrode pad (bonding pad) 3 of the EA modulator B (8) is made longer than the line 15a that is provided between the EA modulator A (7) and the p-type electrode pad (bonding pad) 2 of the EA modulator A (7) so that the application of a drive electrical signal to the EA modulator B (8) is delayed. Pulse superimposition in a modulated light waveform can also be prevented by changing the lengths of the signal lines or producing a delay electrically in the driver.

Third Embodiment

A third embodiment is directed to a substrate on which the optical modulator 40 or 42 according to the first or second embodiment is to be mounted. Since each of the optical modulators 40 and 42 according to the first and second embodiments has three electrodes as shown in FIGS. 1 and 7, a mounting method that is different than in the conventional case is necessary.

Figure 8:
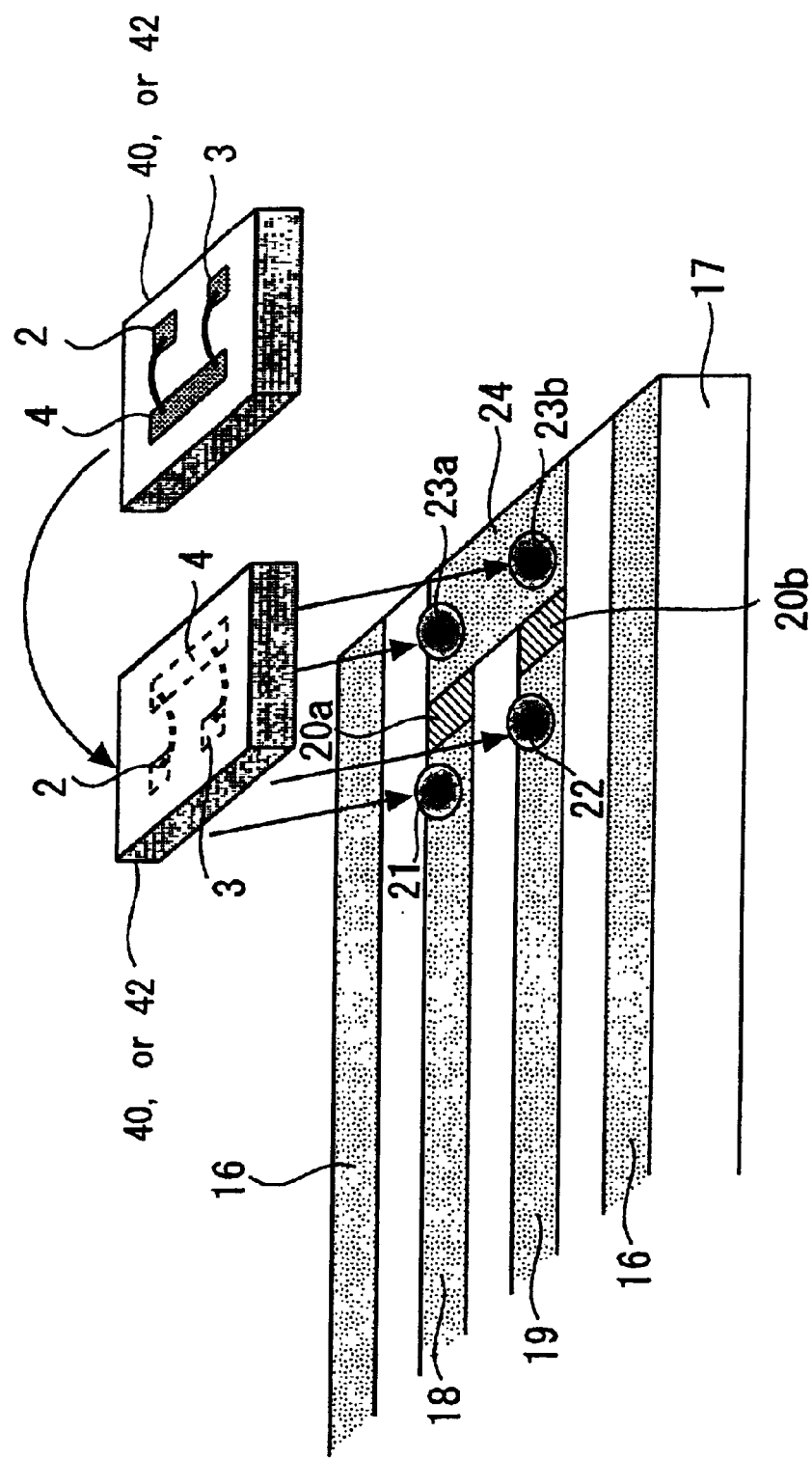
FIG. 8 shows a mounting substrate and a mounting method of an optical modulator according to the third embodiment of the invention.
Figure 9:
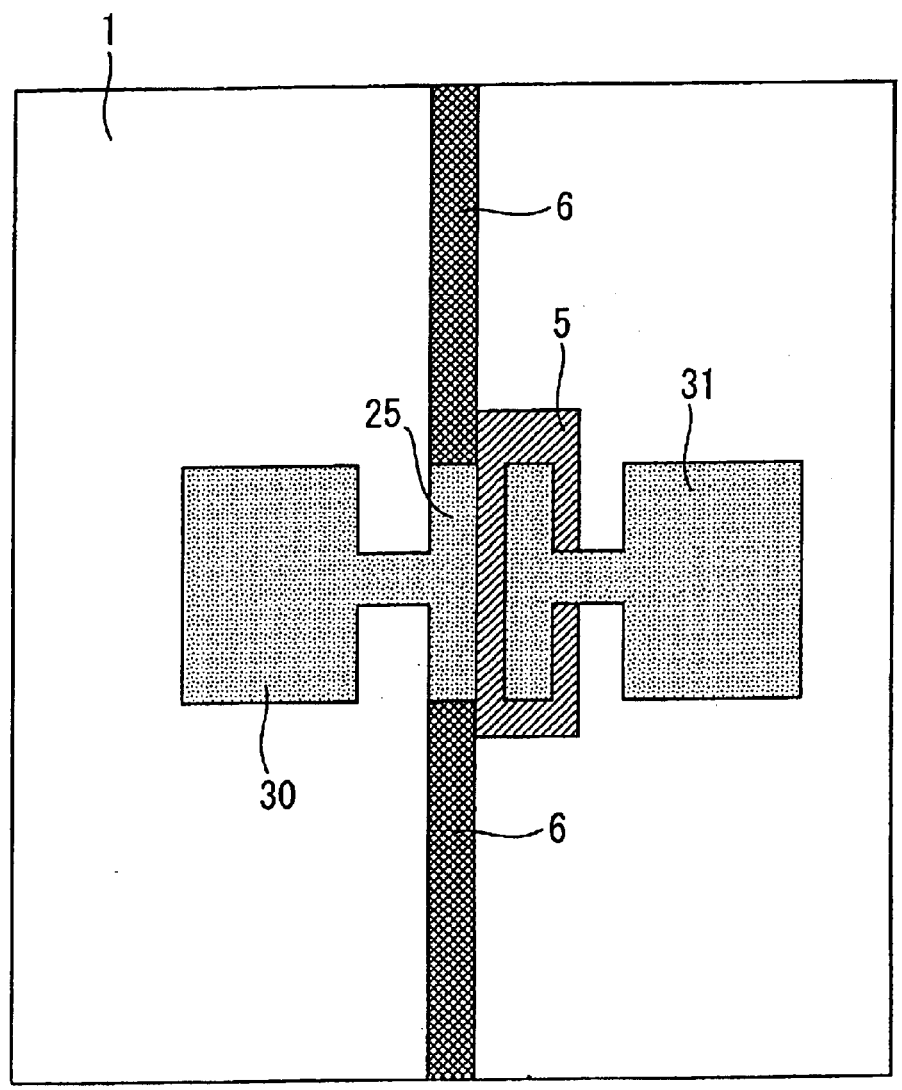
FIG. 9 shows a structure of a conventional electroabsorption (EA) modulator.
Figure 10:
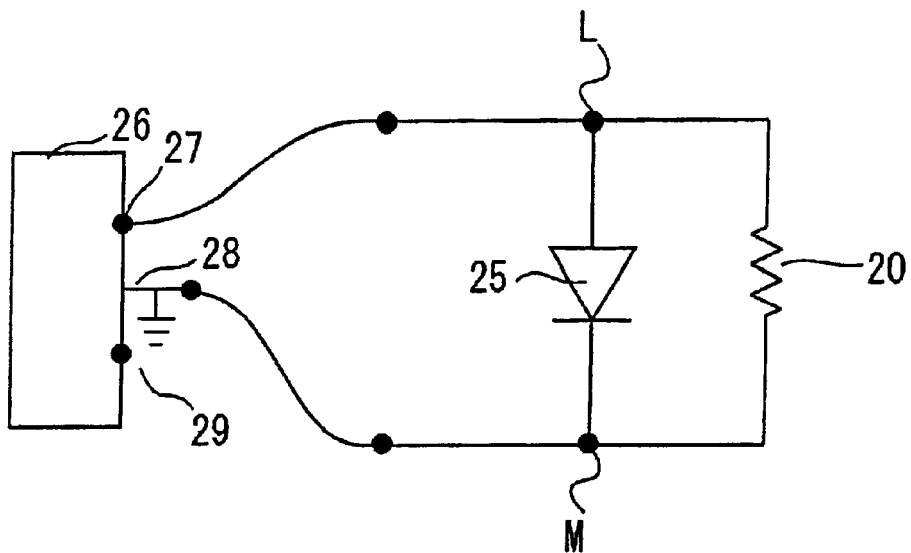
FIG. 10 shows an equivalent circuit in a case where the EA modulator of FIG. 9 is driven by the single-phase driving.
Figure 11:
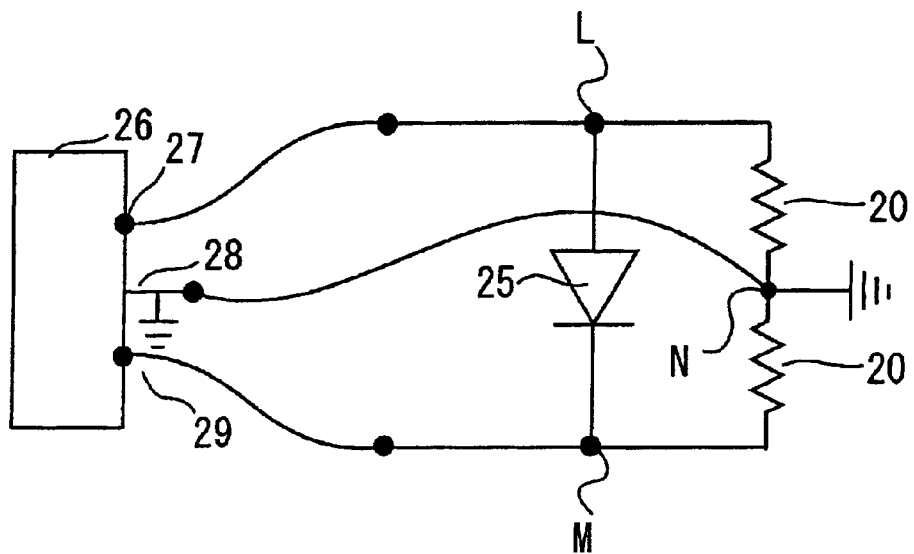
FIG. 11 shows an equivalent circuit in a case where the EA modulator of FIG. 9 is driven by the differential driving.

FIG. 8 shows a mounting substrate and a mounting method of an optical modulator according to the third embodiment of the invention. The elements in FIG. 8 having the same elements in FIGS. 1, 6, or 7 are given the same reference symbols as the latter and hence may not be described. In FIG. 8, reference symbol 17 denotes a dielectric substrate (coupled coplanar substrate) on which the optical modulator 40 or 42 is to be mounted; 16, ground lines that are formed on the dielectric substrate 17; 18, a signal line A that is formed on the dielectric substrate 17; 19, a signal line B that is formed on the dielectric substrate 17; 21, 22, 23a, and 23b, gold balls; and 24, a ground.

As shown in FIG. 8, the coupled coplanar substrate 17 is produced that has the signal lines (strip lines) A (18) and B (19) and two matching resistors 20a and 20b. One side of each of the two matching resistors 20a and 20b is grounded, that is, connected to the ground 24. The optical modulator 40 or 42 is flip-chip-mounted on the substrate 17. The electrodes can be connected to each other in the following manner. The p-type electrode pad 2 of the EA modulator A (7) is connected to the strip line A (18) via the gold ball 21. The n-type electrode pad 3 of the EA modulator B (8) is connected to the strip line B (18) via the gold ball 22. The n-type electrode pad of the EA modulator A (7) that is connected to the common electrode pad 4 is connected to the ground 24 via the gold ball 23a. The p-type electrode pad of the EA modulator B (8) that is connected to the common electrode pad 4 is connected to the ground 24 via the gold ball 23b. With the substrate 17 to which the EA modulator 40 or 42 is flip-chip-bonded, a positive-phase drive signal is applied to the strip line A (18) and an opposite-phase drive signal is applied to the strip line B (19). Because of the use of the flip-chip mounting with the coupled coplanar substrate 17 and the gold balls 21 etc., the third embodiment can cope with frequencies higher than 10 Gbps.

As described above, in the third embodiment, the flip-chip mounting with the coupled coplanar substrate 17 and the gold balls 21 etc. is used for mounting of the optical modulator according to the first or second embodiment. Therefore, the third embodiment can cope with frequencies higher than 10 Gbps.

As described above, in the invention, an optical modulator is configured in such a manner that two EA modulators are connected to each other in series via a transparent waveguide 6. As such, the invention can provide an optical modulator whose cutoff frequency is not halved even in the case of differential driving, as well as a mounting substrate of such an optical modulator and a driving method of such an optical modulator.

In the optical modulator, a second conductivity electrode of the first electroabsorption modulator and a first conductivity type electrode of the second electroabsorption modulator may be provided so as to be electrically isolated from each other.

Here, the optical modulator may further comprise: a first matching resistor connected in parallel to the first electroabsorption modulator; and a second matching resistor connected in parallel to the second electroabsorption modulator.

In the optical modulator, a distance between the second electroabsorption modulator and a bonding pad of the first conductivity type electrode of the second electroabsorption modulator may be longer than a distance between the first electroabsorption modulator and a bonding pad of the second conductivity type electrode of the first electroabsorption modulator.

In the coupled coplanar substrate, the flip-chip bonding to each of the first signal line, the second signal line and the ground line may be made via a gold ball.

In the driving method, a signal that is applied to one of the first electroabsorption modulator and the second electroabsorption modulator may be delayed electrically from a signal that is applied to the other.

In the driving method, a line for applying the signal to the one of the first electroabsorption modulator and the second electroabsorption modulator may be longer than a line for applying the signal to the other.

In the driving method, a line for applying the signal to the one of the first electroabsorption modulator and the second electroabsorption modulator may be wider than a line for applying the signal to the other.

The present invention has been described in detail with respect to various embodiments, and it will now be apparent from the foregoing to those skilled in the art that changes and modifications may be made without departing from the invention in its broader aspects, and it is the invention, therefore, in the appended claims to cover all such changes and modifications as fall within the true spirit of the invention.

The entire disclosure of Japanese Patent Application No. 2001-188481 filed on Jun. 21, 2001 including specification, claims, drawings and summary are incorporated herein by reference in its entirety.

What is claimed is:

1. An optical modulator comprising:
   first and second electroabsorption modulators disposed on an insulating semiconductor layer and electrically connected to each other in series, each of said first and second electroabsorption modulators including first and second conductivity type cladding layers and first and second conductivity type electrodes respectively electrically contacting said first and second conductivity type cladding layers, the first and second conductivity types being opposite from each other; and
   a common electrode to which said first conductivity type electrode of said first electroabsorption modulator and said second conductivity type electrode of said second electroabsorption modulator are connected.

2. The optical modulator according to claim 1, wherein said second conductivity type electrode of said first electroabsorption modulator and said first conductivity type electrode of said second electroabsorption modulator are electrically isolated from each other.

3. The optical modulator according to claim 2, further comprising:
   a first matching resistor connected in parallel with said first electroabsorption modulator; and
   a second matching resistor connected in parallel with said second electroabsorption modulator.

4. The optical modulator according to claim 3, wherein a distance between said second electroabsorption modulator and a bonding pad of said first conductivity type electrode of said second electroabsorption modulator is longer than a distance between said first electroabsorption modulator and a bonding pad of said second conductivity type electrode of said first electroabsorption modulator.

5. The optical modulator according to claim 2, wherein a distance between said second electroabsorption modulator and a bonding pad of said first conductivity type electrode of said second electroabsorption modulator is longer than a distance between said first electroabsorption modulator and a bonding pad of said second conductivity type electrode of said first electroabsorption modulator.

6. The optical modulator according to claim 2, comprising:
   a coupled coplanar substrate on which said optical modulator is mounted,
   a first signal line to which said second conductivity type electrode of said first electroabsorption modulator is flip-chip-bonded;
   a second signal line to which said first conductivity type electrode of said second electroabsorption modulator is flip-chip-bonded; and
   a ground line to which said common electrode is flip-chip-bonded.

7. The coupled coplanar substrate according to claim 6, including gold spheres flip-chip bonding each of said first signal line, said second signal line, and said ground line.

8. The optical modulator according to claim 1, further comprising:
   a first matching resistor connected in parallel with said first electroabsorption modulator; and
   a second matching resistor connected in parallel with said second electroabsorption modulator.

9. The optical modulator according to claim 8, wherein a distance between said second electroabsorption modulator and a bonding pad of said first conductivity type electrode of said second electroabsorption modulator is longer than a distance between said first electroabsorption modulator and a bonding pad of said second conductivity type electrode of said first electroabsorption modulator.

10. The optical modulator according to claim 1, comprising:
    a coupled coplanar substrate on which said optical modulator is mounted,
    a first signal line to which said second conductivity type electrode of said first electroabsorption modulator is flip-chip-bonded;
    a second signal line to which said first conductivity type electrode of said second electroabsorption modulator is flip-chip-bonded; and
    a ground line to which said common electrode is flip-chip-bonded.

11. The coupled coplanar substrate according to claim 10, including gold spheres flip-chip bonding each of said first signal line, said second signal line, and said ground line.

12. The optical modulator according to claim 1, wherein said first and second electroabsorption modulators are optically connected in series.

13. The optical modulator according to claim 12 including an optical waveguide in contact with and optically connecting said first and second electroabsorption modulators in series.

* * * * *